Aug. 18, 1964  F. P. THOMAS  3,145,017

AGITATOR FOR DISPENSING FREEZER

Filed June 6, 1962

INVENTOR.
FRANK P. THOMAS
BY
*Lockwood, Woodard, Smith & Weikart*
Attorneys 3,145,017
AGITATOR FOR DISPENSING FREEZER
Frank P. Thomas, Zionsville, Ind., assignor to General Equipment Manufacturing and Sales, Inc., Indianapolis, Ind., a corporation of Indiana
Filed June 6, 1962, Ser. No. 200,399
2 Claims. (Cl. 259—45)

This invention relates generally to dispensing freezers and in particular to an improved agitator or dasher construction for dispensing freezers or the like.

In U.S. Patent No. 2,402,931, issued to Frank Thomas on June 25, 1946, there is disclosed a dispensing freezer apparatus having a tubular, cylindrical freezing chamber. Extending axially through the chamber is a rotating agitator having a series of spirally located, curved blades which function to scrape the frozen mix off the curved inner surface of the freezing chamber and to propel it axially through the chamber toward the dispensing outlet. The agitator structure shown in the above identified patent operates satisfactorily particularly as to propelling the mix toward the dispensing end of the freezing chamber. It suffers from a disadvantage, however, arising from the difficulty in maintaining the precise proper clearance between the curved blades and the surface of the freezing chamber required to provide clean scraping of the walls. Hinging of the curved blades, so that they will always assume the proper scraping engagement with the freezing chamber wall involves considerable mechanical design difficulties and has proved to be generally impractical.

One can in part meet this difficulty by providing the agitator with an array of fixed curved blades and hinged, straight or rectilinear blades. In such an arrangement the rectilinear, hinged blades do substantially all of the scraping from the freezing chamber wall leaving nothing for the curved blades to work against.

The structure of the present invention overcomes this difficulty by providing a dynamic unbalance of the agitator so that, while the hinged construction of the rectilinear scraping blades maintains them in scraping relation with the freezing chamber wall, the displacement of the shaft of the agitator during rotation because of the dynamic unbalance also maintains the curved blades in good scraping relation with the freezing chamber wall. The dynamic unbalance of the agitator is created by placing all of the rectilinear, hinged scraping blades on one side of the agitator shaft with the curved blades all being located on the opposite side of the shaft. The curved blades are designed so as to have greater total mass than the rectilinear blades and the shaft is thus unbalanced with the curved blade side being the heaviest. By allowing proper clearance at the agitator shaft bearings, when the agitator is rotated the dynamic unbalance of the agitator will hold the curved blades against or in good scraping relation to the freezing chamber wall and the rectilinear hinged blades will pivot outwardly to also scrape the freezing chamber wall effectively.

The primary object of the present invention is to provide an improved dasher or agitator construction for dispensing freezers which provides efficient scraping engagement of both rectilinear and curved blades carried by the agitator.

This and other objects will become apparent as the description proceeds with reference to the accompanying drawings in which.

Figure 1:
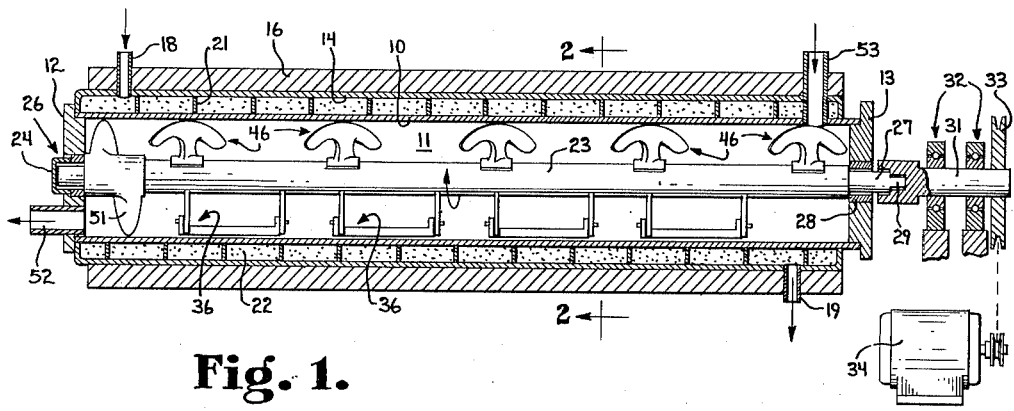
FIG. 1 is a side sectional view of the freezing chamber portion of a dispensing freezer and showing the agitator construction of the present invention.
Figure 2:
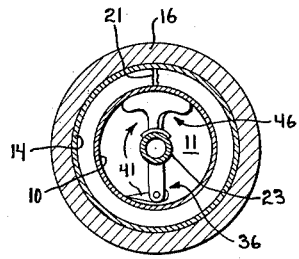
FIG. 2 is a sectional view taken generally along the line 2—2 of FIG. 1.

Referring to the drawings, FIG. 1 illustrates the freezing chamber and surrounding parts incorporated in a dispensing freezer of the type shown in Thomas Patent No. 2,402,931. The structure includes a tubular cylinder 10 providing a freezing chamber 11, the cylinder 10 being closed at its opposite ends by closure plates or caps 12 and 13. The cylinder 10 axially interfits with the larger cylinder 14 and the cylinder 14 is enclosed by formed, thermal insulating material 16. The annular space between the cylinders 10 and 14 is supplied with refrigerant fluid through the refrigerant inlet 18, the refrigerant exiting from the assembly through the refrigerant outlet 19. A helically formed copper band 21, secured to the outer surface of the cylinder 10 and engaging the inner surface of the cylinder 14, directs the circulation of refrigerant 22 as it moves from the inlet 18 to the outlet 19.

Extending axially through the freezing chamber 11 is an agitator shaft 23, preferably tubular in configuration and formed of stainless steel. A reduced end portion 24 of the shaft is supported by a conventional bearing assembly 26 carried by the plate 12. For a purpose to be subsequently described the bearing clearance of the shaft portion 24 and the supporting bearing is somewhat enlarged and of the order of .010 inch. A reduced end portion 27 of the shaft 23 is also supported for rotation within a conventional bearing sleeve 28 and here, also a somewhat exaggerated clearance is provided between the shaft portion 27 and the bearing. The adjacent end of the shaft 23 is formed to provide a drive tang indicated at 29 linking the shaft for rotation with a power shaft 31. The drive tang forming the junction between the shaft 23 and the power shaft 31 is also formed so as to provide substantial clearance in the junction.

The power shaft 31 is supported by spaced bearings of conventional type indicated at 32. At its outer end the shaft carries a pulley 33 which is belted to a drive motor indicated schematically at 34.

Substantially aligned along one side of the shaft 23 are a series of straight or rectilinear scraping blade assemblies indicated generally at 36. As may best be seen in FIG. 4 each of the assemblies 36 includes radially extending members 37 and 38. Each of the members 37 is apertured to receive a pin 39 which is integrally formed with or rigidly attached to a scraping blade member 41. The member 38 is notched, as indicated at 38a to provide clearance for pivotal movement of blade 41. The end of the blade opposite the pin 39 is apertured to receive a pin 42 which extends freely through the adjacent portion of the blade member 41 and seats within a registering aperture in the member 38. Each of the blade members 41 is provided with a rectilinear scraping edge 43. From an inspection of FIG. 4 it will be evident that the scraping members 41 are supported for pivotal movement about an axis which is offset from the rotational axis of the shaft 23. Since the mass of each of the scraping members 41 is offset from the pivotal axis provided at the pins 39 and 42, upon rapid rotation of the shaft 23 in the direction indicated in FIG. 4, the scraping edge portion 43 of the blade members will be urged or biased outwardly by centrifugal force, the direction of bias of the blade members being indicated in FIG. 3.

Figure 5:
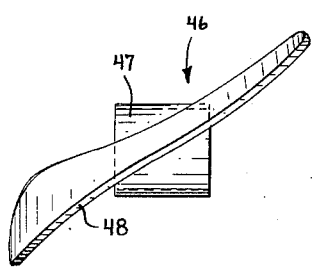
FIG. 5 is a top view of one of the curved blades utilized on an agitator embodying the present invention.

Substantially aligned on the opposite side of the shaft 23 from the scraper blade assemblies 36 are a series of curved blades 46. As may best be seen in FIG. 5 the curved blade assemblies each include a base portion 47 having a curved surface which accommodates the surface of the shaft 23 and to which it is rigidly attached by any suitable means. The beveled scraping surface 48 extends at an angle with the axis of the shaft 23 and the blades are curved to conform to the surface of the freezing chamber provided by the cylinder 10. At the end of the shaft adjacent the reduced diameter portion 24 there is rigidly secured a conventional auger element 51 which rotates with the shaft 23 for gathering the frozen mix moved to the end of the freezing chamber and for feeding it through the frozen mix output passage 52. An unfrozen mix input passage 53 is provided at the opposite end of the freezing chamber and serves to permit introduction of mix into the chamber.

In operation, with the shaft 23 rotating relatively rapidly, the power for such rotation being supplied by the motor 34, and with refrigerant circulating through the space between the cylinders 10 and 14, upon the introduction of unfrozen mix into the freezing chamber 11 through the inlet 53, the mix will be distributed around the inner surface of the cylinder 10 and will be frozen by heat exchange therewith. The frozen film will be continuously scraped from the wall of the freezing chamber by the rectilinear blade assemblies 36 and, because of the angular disposition of the curved blades 46, the frozen mix will be carried forwardly to the auger member 51 and discharged through the frozen mix outlet passage 52.

Figure 3:
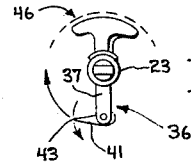
FIG. 3 is an end view of the agitator illustrating the direction of motion of the agitator blades when the agitator is rotated.
Figure 4:
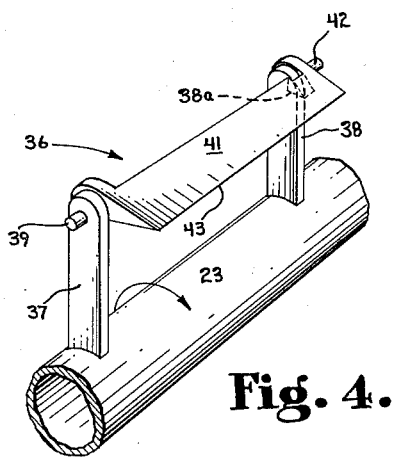
FIG. 4 is a fragmentary, perspective view of one of the hinged, rectilinear scraping blades.

As will be evident from FIG. 3, centrifugal force acting upon the blades 41 will maintain their scraping edge 43 in good scraping relation with the wall of the freezing chamber as the shaft 23 rotates. Because of the dynamic unbalance of the shaft, during its rotation it will be displaced somewhat moving the scraping edge of the curved blades 46 outwardly against the wall of the freezing chamber, such displaced position of the scraping edge of the curved blade being indicated, in exaggerated amplitude, by a broken line in FIG. 3. Although the shaft is thus displaced or deflected, the rectilinear blades 41 will maintain their scraping edge 43 in engagement with the freezing chamber wall because of their pivotal mounting. The clearance in the bearings 26, 28 and in the drive tang connection 29 is sufficient to permit the required displacement or deflection of the shaft 23 under the influence of its dynamic unbalance. The agitator thus conforms to the curvature of the freezing chamber wall in accord with the variable loading applied to it. The agitator construction of the present invention maintains the scraping efficiency of the curved blades and increases the efficiency, that is, the production per unit of time, by an amount of the order of 25 percent over that of prior art structures such as that of the above mentioned Thomas patent.

While the invention has been disclosed and described in some detail in the drawings and foregoing description, they are to be considered as illustrative and not restrictive in character, as other modifications may readily suggest themselves to persons skilled in this art and within the broad scope of the invention, reference being had to the appended claims.

The invention claimed is:

1. In a dispensing freezer the combination of a cylindrical freezing chamber adapted to receive unfrozen mix, a motor driven shaft, support means mounting said shaft for rotation axially within said chamber, a delivery aperture in said chamber adjacent one end of said shaft, an auger member carried by said shaft adjacent said delivery aperture for directing frozen mix into said delivery aperture, a series of curved scraper blades mounted to extend radially along one side of said shaft, the scraping surface of each of said curved scraper blades extending at an angle with the shaft axis and curved to conform to the surface of said chamber from moving frozen mix to said auger member, a series of rectilinear scraper blades mounted along the opposite side of said shaft and supported for pivotal movement on an axis offset from the shaft axis, the scraping surface of each of said rectilinear blades being aligned with the shaft axis and biased by centrifugal force upon shaft rotation into scraping engagement with the chamber surface for scraping frozen mix from the chamber wall surface, said curved blades having a greater mass than said rectilinear blades, whereby a dynamic unbalance is created upon rotation of said shaft providing displacement of said curved blades transverse to the axis of shaft rotation and thus good scraping relation of said curved blades with the chamber wall, the centrifugal force biased pivotal motion of said rectilinear blades maintaining them in good scraping relation with the chamber wall despite the dynamic unbalance of the shaft.

2. In a dispensing freezer the combination of a cylindrical freezing chamber adapted to receive unfrozen mix, a motor driven shaft, support means mounting said shaft for rotation axially within said chamber, a delivery aperture in said chamber adjacent one end of said shaft, an auger member carried by said shaft adjacent said delivery aperture for directing frozen mix into said delivery aperture, a series of curved scraper blades mounted to extend radially along one side of said shaft, the scraping surface of each of said scraper blades extending at an angle with the shaft axis and curved to conform to the surface of said chamber for moving frozen mix to said auger member, a series of rectilinear scraper blades mounted along the opposite side of said shaft, the scraping surface of each of said rectilinear blades being aligned with the shaft axis and biased into scraping engagement with the chamber surface for scraping frozen mix from the chamber wall surface, and means providing a dynamic unbalance of said shaft upon rotation thereof whereby said curved blades are displaced transverse to the axis of shaft rotation and thus into good scraping relation with the chamber wall.

References Cited in the file of this patent

UNITED STATES PATENTS

| 522,806 | Snook | July 10, 1894 |
| 2,284,907 | Kinzey | June 2, 1942 |
| 2,491,852 | Carvel | Dec. 20, 1949 |

FOREIGN PATENTS

| 506,484 | Belgium | Nov. 14, 1951 |